United States Patent [19]

Matsuda et al.

[11] Patent Number: 5,563,493
[45] Date of Patent: Oct. 8, 1996

[54] POWER SOURCE SYSTEM OF PORTABLE INFORMATION PROCESSING SYSTEM USING BATTERY

[75] Inventors: Kouichi Matsuda; Hidekiyo Ozawa; Hidetoshi Yano; Toshiro Obitsu; Tetsuo Yamamoto, all of Kawasaki, Japan

[73] Assignee: Fujitsu Limited, Kawasaki, Japan

[21] Appl. No.: 175,723

[22] Filed: Dec. 30, 1993

[30] Foreign Application Priority Data

Jan. 13, 1993 [JP] Japan ................... 5-003943

[51] Int. Cl.⁶ ........................................... H01M 10/44
[52] U.S. Cl. ..................... 320/6; 320/15; 361/683
[58] Field of Search ........................... 320/6, 8, 5, 15; 361/685, 683

[56] References Cited

U.S. PATENT DOCUMENTS

| | | | |
|---|---|---|---|
| 5,162,720 | 11/1992 | Lambert | 320/6 |
| 5,162,817 | 11/1992 | Hosoi et al. | 361/393 |
| 5,264,777 | 11/1993 | Smead | 320/6 |
| 5,420,493 | 5/1995 | Hargadon et al. | 320/5 |

FOREIGN PATENT DOCUMENTS

| | | | |
|---|---|---|---|
| 420645 | 4/1991 | European Pat. Off. | G06F 1/26 |
| 463593 | 1/1992 | European Pat. Off. | G06F 1/26 |
| 3404564 | 8/1985 | Germany | H02J 7/34 |
| 2242794 | 10/1991 | United Kingdom | H02J 7/00 |

*Primary Examiner*—Robert Nappi
*Attorney, Agent, or Firm*—Staas and Halsey

[57] ABSTRACT

A system comprises: a portable computer main body having therein a power source circuit section having a battery pack; and a plurality of auxiliary battery units which are mechanically connected and fixed to a casing of the computer main body and are electrically connected in series to a power source input terminal. A charge/discharge control section is provided for each of the auxiliary battery units. The charge/discharge control section sequentially charges from the auxiliary battery unit locating on the computer main body side when charging. On the contrary, the charge/discharge control section sequentially discharges from the auxiliary battery unit on the opposite side which is farthest from the computer main body when discharging. There is also a system construction having a single auxiliary battery unit.

42 Claims, 14 Drawing Sheets

POWER SOURCE SYSTEM OF PORTABLE INFORMATION PROCESSING SYSTEM USING BATTERY

BACKGROUND OF THE INVENTION

The invention relates to a power source system of a portable information processing system using a battery, such as a personal computer which is driven by a battery power source and, more particularly, to a power source system of a portable information processing system using a battery which enables a long time operation by connecting and fixing an auxiliary battery unit to the system main body.

Since the use of a portable personal computer of the notebook type mainly in the outdoor is increasing, it is required that it can be used for a long time even in a state in which there is no AC adapter or the like.

Conventionally, as a battery unit of a portable type personal computer, a combination of a main battery unit built in the personal computer main body and an auxiliary battery unit is used. The auxiliary battery unit, which is attached to the outside, is a unit simply having a battery therein and accordingly, total battery capacity can be increased. In case of charging the auxiliary battery unit, the auxiliary battery unit which was completely used is detached from the computer main body and is set to an exclusive-use AC adapter, and is charged.

Therefore, when the conventional auxiliary battery unit is used, in a state where there is no AC adapter, there is a problem such that since the operation of a capacity larger than the capacity of a combination of the battery unit built in the personal computer main body and one auxiliary battery unit cannot be performed, it is difficult to perform the operation for a long time. Even if a plurality of auxiliary battery units are prepared, there is a problem such that it is troublesome to exchange the batteries during the operation.

When charging, it is necessary to charge each auxiliary battery unit. When a plurality of units are charged, there is a problem such that the exchange of the batteries for charging must be done many times.

Further, when the battery unit is connected, after the battery unit built in the computer main body is completely used, it is switched to the auxiliary battery unit attached to the outside. Due to this, even when the auxiliary battery unit is finished after that, the power supply to the computer is completely stopped. Therefore, even if a plurality of spare battery units are prepared, since it is impossible to continuously use the computer while exchanging the spare battery units, there is a problem such that the use of the computer must be temporarily stopped each time the spare battery unit is changed.

SUMMARY OF THE INVENTION

According to the invention, there is provided a power source system of an information processing system using a battery in which a spare battery unit can be exchanged and charged while using a computer main body and, further, the apparatus can be continuously used for a long time by a power source capacity which is proportional to the number of spare battery units.

A power source system of the invention comprises: a portable computer main body having therein a power source circuit section; and a plurality of auxiliary battery units which are connected and fixed mechanically to a casing of the computer main body and also electrically serially connected to a power source input terminal of each unit.

A battery circuit section is provided for each auxiliary battery unit. The battery circuit section charges so as to sequentially complete the charging from the auxiliary battery unit which is located on the computer main body side at the time of charging. On the other hand, the battery circuit section discharges so as to sequentially supply a power source from the auxiliary battery unit on the opposite side which is farthest from the computer main body at the time of discharging.

The battery circuit section of the spare battery unit has a battery pack therein and has an input terminal and an output terminal. An output terminal of the other auxiliary battery unit or an output terminal of the AC adapter, for converting an AC power source to a DC power source, is connected to the input terminal. The output terminal is connected to an input terminal of the other auxiliary battery unit or an input terminal of the power source of the computer main body. An input power source voltage from the input terminal is detected by a voltage detecting section. The connection of an AC adapter or the connection of the other holding battery unit can be discriminated by the detected voltage. An output current to the output terminal is detected by a current detecting section. A first discharging switch, to turn on or off the power source supply, is provided for a power source line to the output terminal. A second discharging switch, to turn on or off the power source supply, is provided for an output line from a battery pack. Further, a charging switch, to turn on or off the power source supply, is provided for a charging line from the input terminal to the spare battery power source.

A charge control section which is realized by a microprocessor detects a connection of the AC adapter from the detected voltage of the input terminal, and only when the detected current to the output terminal is equal to or less than a predetermined value, the charging switch is turned on, thereby charging to the battery pack.

In the case where the connection of the AC adapter or another auxiliary battery unit is detected from the detected voltage of the input terminal, a discharge control section which is realized by a microcomputer turns on the first discharging switch and also turns off the second discharging switch and supplies an external power source to the front stage unit. In the case where no connection of the AC adapter or another auxiliary battery unit is detected from the detected voltage of the input terminal, the discharge control section both of the first and second discharging switches are turned on and a power source is supplied to the front stage from the self battery pack.

A high speed charging section supplies a current which is close to the maximum allowable charging current of the battery pack and thereby charge at a high speed. A trickle charging section supplies an arbitrary current which is determined by a potential difference between the input power source voltage, the charge voltage of the battery pack, and a specified resistance, to charge and connected in parallel to the charge switching section. When the detected current to the output terminal is equal to or less than a predetermined value in a state in which the connection of the AC adapter is detected, the charge control section makes the high speed charging section operative, thereby charging at a high speed. When the detected current to the output terminal exceeds the predetermined value, the trickle charging section is made operative, thereby trickle charging.

When either one of the following three conditions is obtained, the charge control section turns off the charge switch section, thereby stopping the charging:

I. when the elapsed time of a timer which is activated at the start of the charging reaching a predetermined time;

II. when the detected temperature by a temperature sensor provided for the spare battery power source exceeds a predetermined temperature; and III. the power source voltage of the spare battery power supply is observed, and when a change such that the voltage which is rising in association with the charging exceeds the peak voltage and decreases is detected.

Further, a display section to show a state of the system is provided for the spare battery unit. The display section displays at least an input state of the external power source voltage for the input terminal, a charging state, and a state of the battery voltage. The display section displays information only during the ON operation of the display switch.

The discharge control section detects a discharged current of the battery pack and turns off the second discharging switch and detaches the battery pack when it detects excessive current. When the discharged voltage of the battery pack is detected and is equal to or less than a specified voltage, the discharge control section turns off both of the first and second switches and shuts off the power source supply to the unit at the front stage.

The power source circuit section provided for the computer main body is substantially the same as the built-in circuit of the spare battery unit except that the first discharging switch is not provided.

Therefore, a plurality of auxiliary battery units can be connected and used and the computer can be driven for a long time according to the number of auxiliary battery units connected. When charging, it is also possible to sequentially charge from the unit on the computer side in a state in which a plurality of auxiliary battery units are connected, and it is possible to easily charge without detaching each unit. Further, when the computer is used, the discharging is sequentially executed from the spare battery unit which is located on the outside which is the farthest from the computer. Therefore, in case of detaching some of the auxiliary battery units, it is possible to easily detach the auxiliary battery unit from the auxiliary battery unit which becomes empty. Further, when the computer is used, by connecting the AC adapter, if there are some units which finished the battery packs, they can be charged sequentially from the unit on the computer main body side. In this case, if the computer is in a stand-by state in which current consumption is small, high speed charging is executed. When the computer is in an operation state in which current consumption is large, trickle charging is executed.

A modified embodiment of the invention has a construction such that a single spare battery unit is connected to the computer main body. As a spare battery unit in this case, it is sufficient to remove the second discharging switch provided for the output line of the spare battery power source which is provided in case of providing a plurality of units, and the other point is substantially the same. It is sufficient that the power source circuit section of the computer main body in this case is the same as the power source system to which a plurality of spare battery units can be connected.

In the power source system to which the single spare battery unit is connected, it is possible to charge the auxiliary battery unit while connected. There is no need to detach the auxiliary battery unit, so that the unit may be easily charged. When the computer is used, the discharging from the spare battery unit is started and when the spare battery unit is finished, the discharging mode is switched to discharge from the battery pack of the main body. Further, by connecting the AC adapter when the computer is used, if there are some units which fully discharge the battery packs, the charging can be sequentially executed while using the computer in accordance with the order of the battery packs built in the computer main body and the spare battery unit.

The above and other objects, features, and advantages of the present invention will become more apparent from the following detailed description with reference to the drawings.

DETAILED DESCRIPTION OF THE PREFERRED EMBODIMENT

Figure 1:
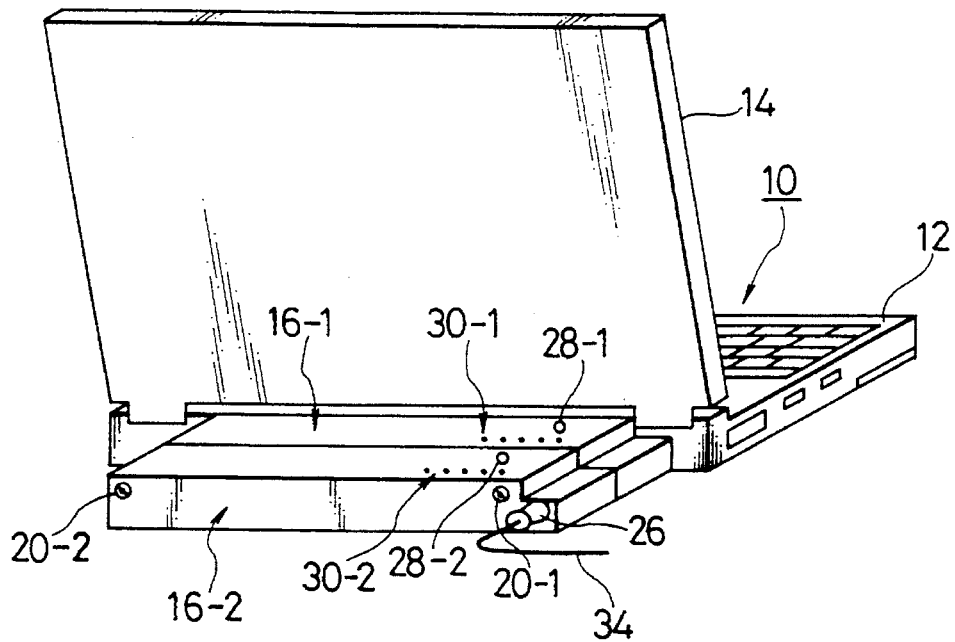
FIG. 1 is an explanatory diagram showing an embodiment of the invention in which a plurality of auxiliary battery units are connected to a computer.

FIG. 1 shows the first embodiment of the invention in which a plurality of battery units are used. In FIG. 1, a personal computer 10 comprises: a computer main body 12 having a key board; and a closable display section 14 provided as a cover for the computer main body 12. A liquid crystal display panel or the like is provided on the inside of the display section 14 in open state as shown in the diagram. For example, two auxiliary battery units 16-1 and 16-2 are attached behind the computer main body 12.

Figure 2:
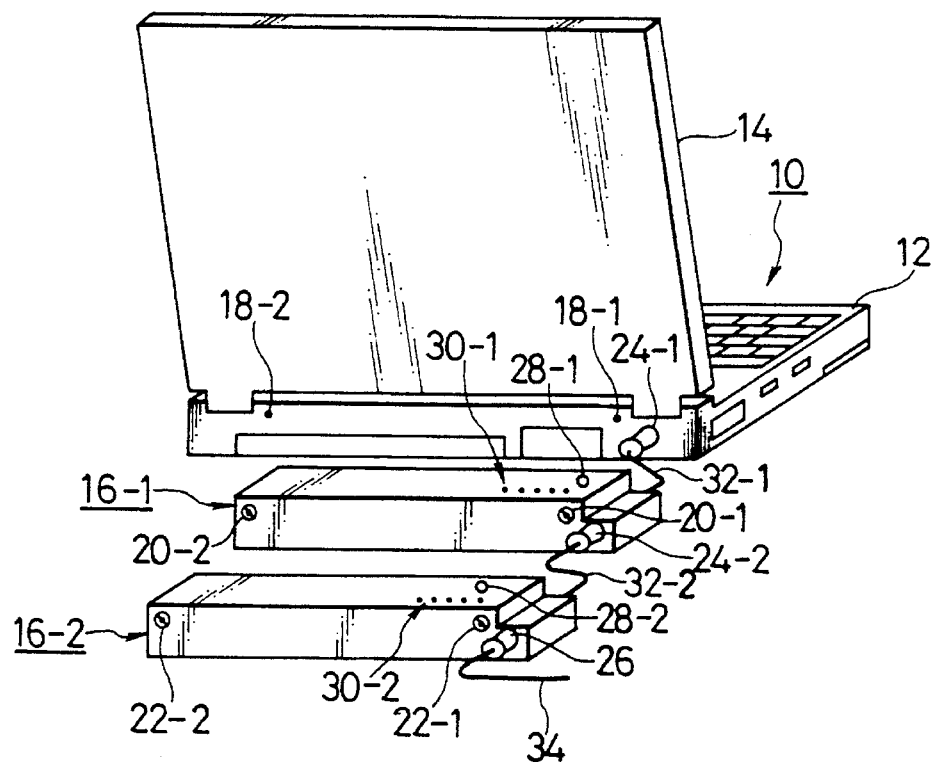
FIG. 2 is an exploded diagram of FIG. 1.
Figure 3:
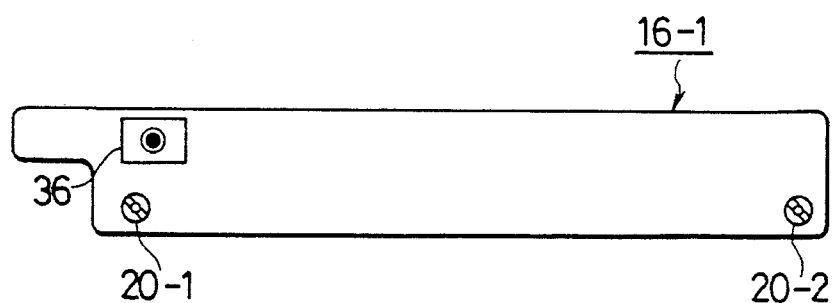
FIG. 3 is a rear view of an auxiliary battery unit.

FIG. 2 shows an assembly state of the battery units 16-1 and 16-2 to the computer main body 12 in FIG. 1. First, a connector 24-1 at a tip of a cable 32-1 provided for the auxiliary battery unit 16-1 is connected to the external power source input terminal of the computer main body 12. The tips of screws 20-1 and 20-2 whose heads are projected to the back of the auxiliary battery unit 16-1 are positioned to screw holes 18-1 and 18-2 and are screwed and fixed.

Subsequently, the auxiliary battery unit 16-2 is attached. First, a connector 24-2 to which a cable 32-2 on the attaching surface side of the auxiliary battery unit 16-2 is connected to the power source input terminal behind the auxiliary battery unit 16-1 which has already been attached. The screw portions at the tips of screws 22-1 and 22-2 of the battery unit 16-2 are positioned to the screws 20-1 and 20-2 of the auxiliary battery unit 16-1, which has already been attached. Screw holes are formed in the heads of the screws 20-1 and 20-2. Therefore, by screwing the screw portions at the tips of the screws 22-1 and 22-2 into the screw holes of the head portions of the screws 20-1 and 20-2, the auxiliary battery unit 16-2 can be fixed to the auxiliary battery unit 16-1.

A connector 26 of a cable 34, led out from the AC adapter which is used for charging, is connected to the power source input terminal of the auxiliary battery unit 16-2 attached at the second time. By connecting the connector 26 from the AC adapter, the auxiliary battery units 16-1 and 16-2 and, further, a battery of the power source circuit section built in the personal computer 10 can be charged.

LED display sections 30-1 and 30-2 in which a plurality of light emitting diodes (LED) are arranged are provided in the upper portions of the auxiliary battery units 16-1 and 16-2. The LED display sections 30-1 and 30-2 execute the displaying operations for a period of time during which LED switches 28-1 and 28-2 provided at the sides of LED display sections 30-1 and 30-2 are depressed.

FIGS. 3, 4, 5, and 6 show a rear view, a plan view, a front view, and a left side view of the auxiliary battery unit 16-1 shown in FIG. 1. As will be apparent from the rear view of FIG. 3, a power source input terminal 36 is provided on the rear side of the auxiliary battery unit 16-1, and the screws 20-1 and 20-2 having screw holes in the heads are provided at two positions of the upper corners of the upper portion. As will be apparent from the plan view of FIG. 4, the LED display section 30-1 using five LEDs is provided in the upper portion of the auxiliary battery unit 16-1. The LED switch 28-1 is provided near the LED display section 30-1. A printed circuit board 40, on which a circuit unit has been installed, and a battery pack 38 are provided in the auxiliary battery unit 16-1 as shown by a broken line. In the embodiment, eight NiCd cells are assembled in the battery pack 38 in a state in which they are connected in series. Since one NiCd cell is set to 1.2 V, the output voltage of the battery pack 38 is equal to 9.6 V.

Figure 4:
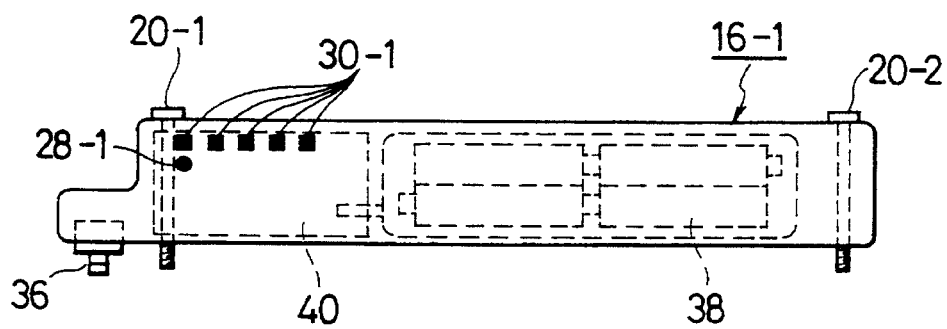
FIG. 4 is a plan view of the auxiliary battery unit.
Figure 5:
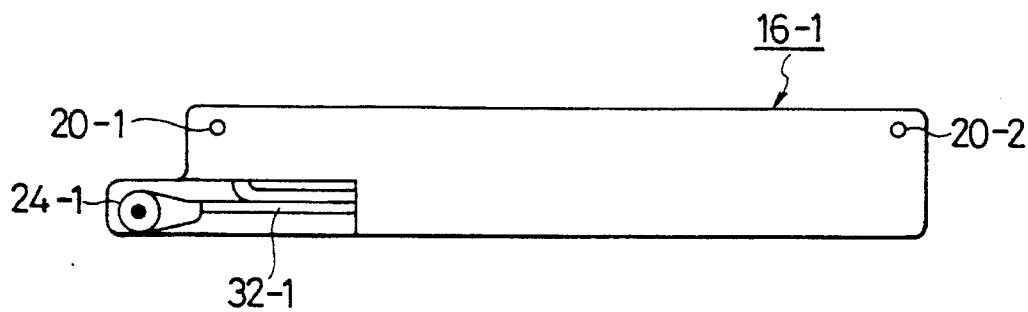
FIG. 5 is a front view of the auxiliary battery unit.
Figure 6:
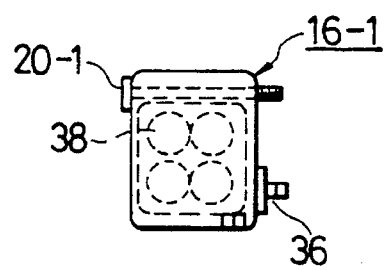
FIG. 6 is a left side view of the auxiliary battery unit.

As shown in the front view of FIG. 5, the connector 24-1 connected to the cable 32-1 is enclosed in the concave portion at the left lower corner of the auxiliary battery unit 16-1. Further, as shown in the left side view of FIG. 6, the screw 20-1 penetrates inside of the battery unit 16-1 and the screw portion is projected to the tip. Four cells are enclosed in the battery pack 38 when it is seen from the side, and as shown in FIG. 4, since those cells are provided in two lines, it is known that total eight cells are enclosed.

Figure 7:
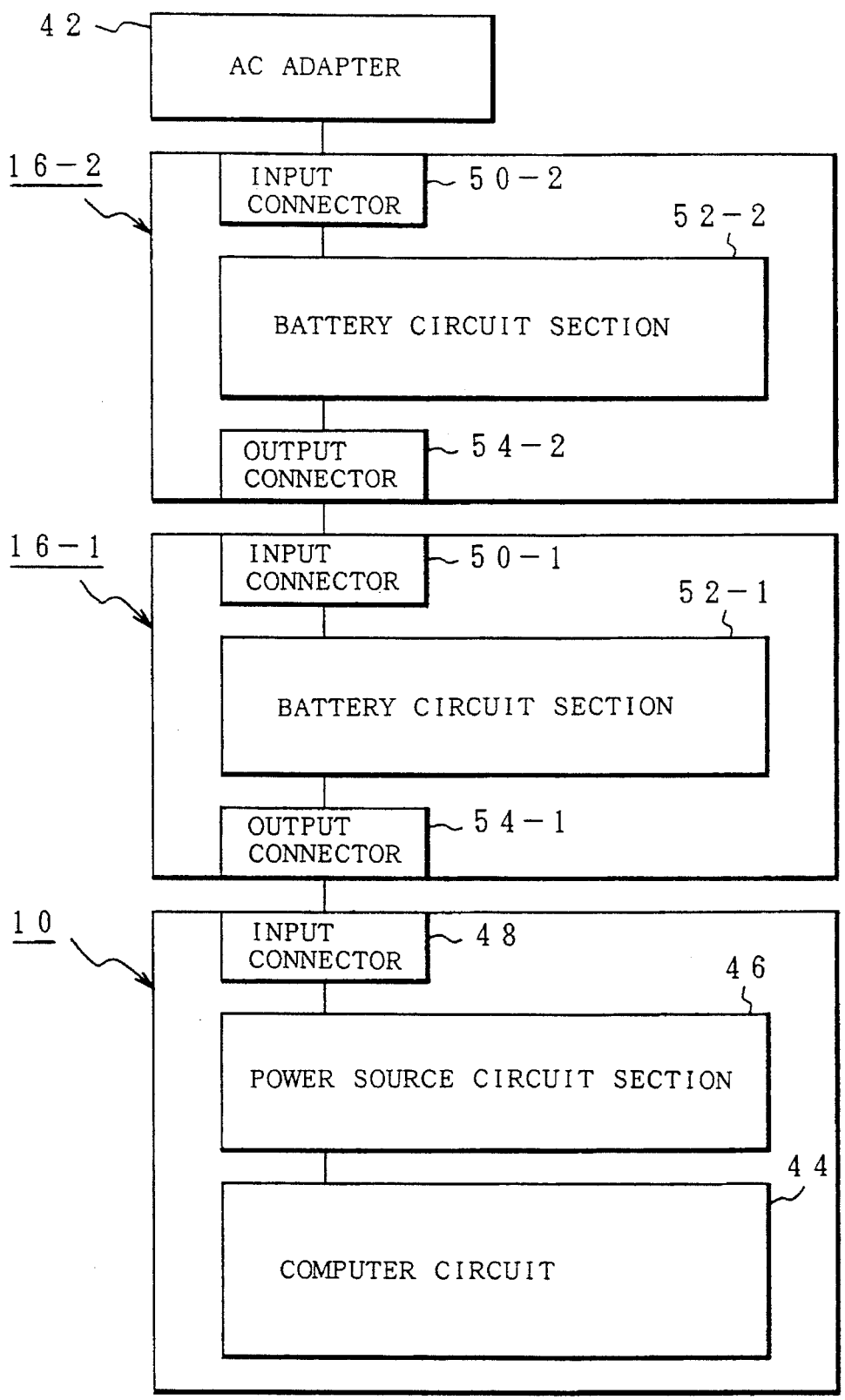
FIG. 7 is a block diagram showing a system construction of the invention.

FIG. 7 shows a system construction of the invention using two auxiliary battery units. The personal computer 10 has a computer circuit 44 therein. A power source is supplied to the computer circuit 44 from a power source circuit section 46. A main battery pack is enclosed in the power source circuit section 46. A current consumption of the computer circuit 44 is, for example, equal to or larger than 160 mA in the operating mode, and is equal to or less than 1 mA in the stand-by mode. An input connector 48 is provided for the power source circuit section 46.

The auxiliary battery unit 16-1 has an input connector 50-1, a battery circuit section 52-1, and an output connector 54-1. Similarly, the battery unit 16-2 also has an input connector 50-2, a battery circuit section 52-2, and an output connector 54-2. An AC adapter 42 inputs, for example, a commercially available voltage of AC 100 V and outputs a specified DC voltage. In the embodiment, the AC adapter 42 generates DC 15 V and a current capacity is equal to 1.33 A. The AC adapter 42 is connected when the personal computer 10 and the auxiliary battery units 16-1 and 16-2 are charged. It is also possible to use the personal computer 10 by connecting the AC adapter 42 when it is used at a location where the AC power source is obtained. As a prerequisite, since the personal computer 10 of the invention is fundamentally used as a portable type, the AC adapter 42 is not connected in an ordinary use state.

Figure 8:
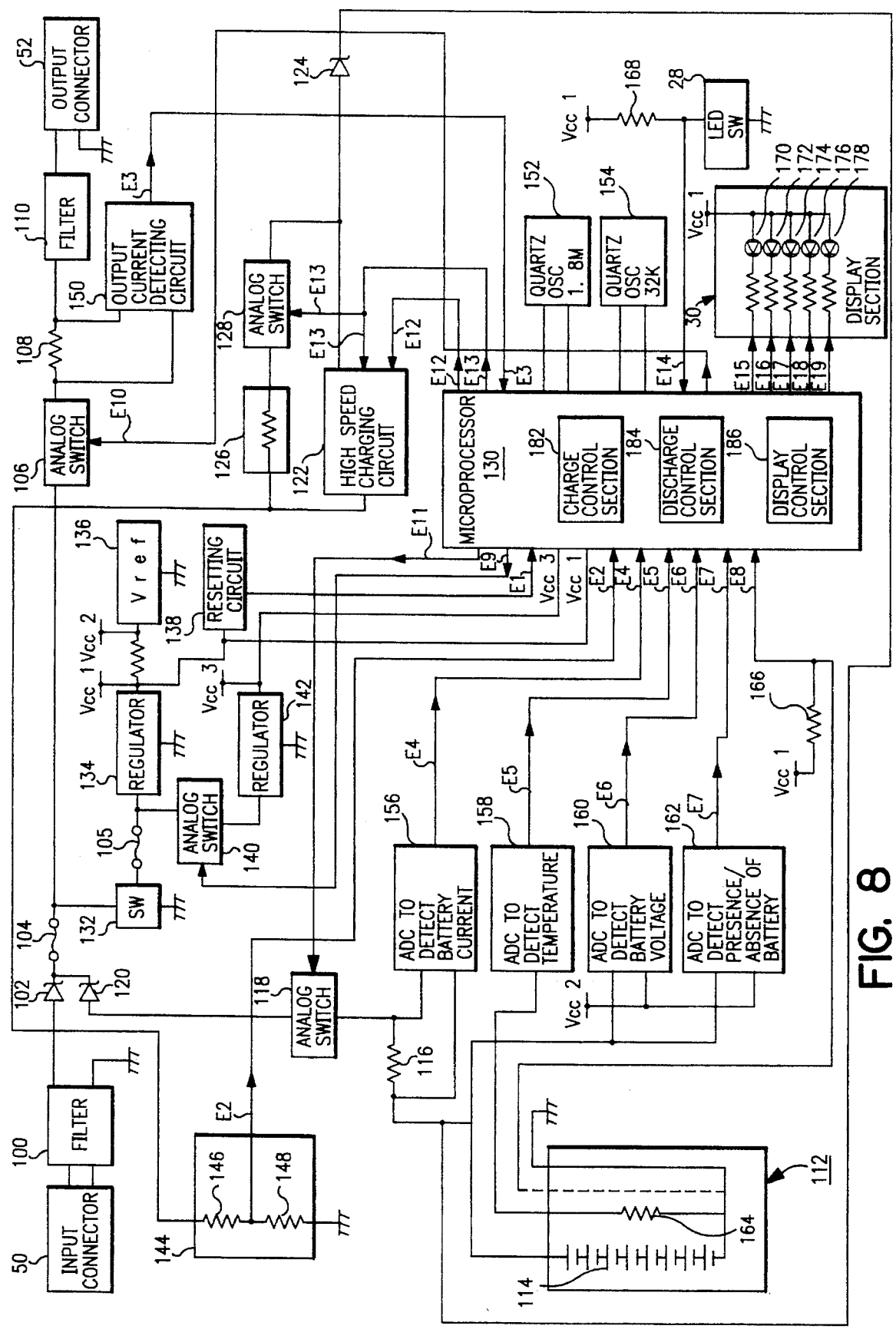
FIG. 8 is a circuit block diagram showing an embodiment of a battery circuit section of a spare battery unit.

FIG. 8 shows a circuit construction of the auxiliary battery unit which is used in the first embodiment. A noise filter 100 is provided subsequent to an input connector 50. A power source line from the noise filter 100 passes through a Zener diode 102 and a fuse 104 is connected to an analog switch 106 which operates as a first discharge switch. An output of the analog switch 106 is connected from a sense resister 108 to detect an output current to an output connector 52 through a noise filter 110. For example, a resistor of 1 Ω is used as a sense resister 108.

A battery pack 112 is formed by serially connecting eight NiCd cells 114. Since an output voltage of the full charging per one NiCd cell 114 is equal to 1.2 V, the battery pack 112 generates 9.6 V in a state of full charge. A capacity of the battery pack 112 is equal to 1400 mA/h. The battery pack 112 has a therein a thermistor 164 to detect an internal temperature.

A charging system for the battery pack 112 is as follows. An output line of the noise filter 100 provided subsequent to the input connector 50 is branched and connected to a high speed charging circuit 122. An output of the high speed charging circuit 122 passes through a Zener diode 124 and is connected to a plus side of the battery pack 112. In parallel with the high speed charging circuit 122, a serial circuit of a trickle resister 126 and an analog switch 128 is connected. A resistor of 470 Ω is used as a trickle resistor 126.

A discharging system from the battery pack 112 will now be described. The plus side of the battery pack 112 is connected to an analog switch 118 through a sense resistor 116 to detect a discharge current. The analog switch 118 operates as a second discharge switch. A resistor of 1 Ω is used as a sense resistor 116. An output of the analog switch 118 is connected to a cathode side of the Zener diode 102 through a Zener diode 120. Due to this, both of the analog switches 118 and 106 must be turned on in order to discharge the battery pack 112.

A charge control and a discharge control for the battery pack 112 are executed by a microprocessor 130. Regulators 134 and 142 are provided as a power source section to produce a power source voltage of the whole circuit including the microprocessor 130. A voltage on the second side of the fuse 104 is applied to the regulator 134 through a switching circuit 132 and a fuse 105. The switching circuit 132 is turned on when an input voltage exceeds, for example, 4 V, and supplies a power source voltage to the regulator 134. The regulator 134 converts the input voltage into a predetermined output constant voltage Vcc1. For instance, 3.2 V is used as a power source voltage Vcc1. A reference voltage generating circuit 136 generates a reference voltage Vcc2, for example, 1.235 V on the basis of the output voltage Vcc1 of the regulator 134. The reference voltage is used by the AD convertor to supply data to the microprocessor 130.

The regulator 142 receives the input voltage when an analog switch 140 is turned on and generates a power source voltage Vcc3, for example, 3.0 V and supplies to the microprocessor 130. The analog switch 140 is turned on by receiving a control signal E9 when the microprocessor 130 detects that an AC adaptor is connected to the input connector 50. Therefore, in the case where the AC adapter is not connected to the input connector 50, the analog switch 140 is turned off and the power source voltage Vcc3 from the regulator 142 is cut. The power source voltage Vcc3 from the regulator 142 is mainly used as a power source voltage of a charging circuit system. Due to this, at the time of the discharge control when no AC adapter is connected, the regulator 142 is cut off, thereby preventing electric power consumption due to the charging circuit system.

A resetting circuit 138 operates when the power source voltage Vcc1 from the regulator 134 is obtained and generates a power on reset signal E1 to the microprocessor 130. By receiving the power on reset signal E1, the microprocessor 130 executes an initial reset.

The microprocessor 130 has a charge control section 182, a discharge control section 184, and a display control section 186 which are realized by a program control.

When the charge control section 182 detects the connection of the AC adapter, the charge control section 182 makes the high speed charging circuit 122 operative on the basis of an output current by the detection signal E3 from an output current detecting circuit 150 in this instance, thereby allowing the charging operation to the battery pack 112 to be executed. Explaining in detail, a check is first made to see if the AC adapter is connected to the input connector 50 or not on the basis of a voltage detection signal E2 obtained as a divided voltage of resistors 146 and 148 provided for a voltage detecting circuit 144. An input voltage from the input connector 50 is equal to DC 15 V in the case where the AC adapter is connected, DC 9.6 V in the case where another auxiliary battery unit is connected, and DC 0 V in the case where none of the AC adapter and the other auxiliary battery unit is connected. Therefore, the charge control section 182 of the microprocessor 130 can recognize the connection of the AC adapter by a voltage detection of DC 15 V on the basis of the voltage detection signal E2 from the voltage detecting circuit 144. When the connection of the AC adapter is detected, the charge control operation by the charge control section 182 is started. The charge control operation is executed according to the magnitude of the current detection signal E3 from the output current detecting circuit 150. For example, Ith=1 mA is first set as a threshold current Ith of the output current. The charge control section 182 makes the high speed charging circuit 122 operative when the detected output current is equal to or less than the threshold current Ith= 1 mA, thereby charging to the battery pack 112 while setting the maximum value of the charging current to 1.2 A. The charging time of the battery pack 112 by high speed charging is, for example, 1.2 hours. When the output current detected by the output current detecting circuit 150 is equal to or larger than the threshold current Ith=1 mA, the charge control section 182 stops the operation of the high speed charging circuit 122 and turns on the analog switch 128 and switches to the trickle charging by the trickle resistor 126. The trickle charging is executed while the personal computer is operating.

The high speed charging circuit 122 and the analog switch 128 for trickle charging are executed by control signals E12 and E13 from the microprocessor 130. When the charge control section 182 detects the connection of the AC adapter, the control signal E12 is made effective. The high speed charging circuit 122 operates by the negative logic for the control signals E12 and E13. Therefore, by the detection of the AC adapter, the control signal E12 is set to the low level. The control signal E13 becomes enable when the output current is equal to or less than the threshold current Ith= 1 mA. That is, since it is the negative logic, the control signal E13 is set to the low level. The high speed charging circuit 122 operates when both of the control signals E12 and E13 are set to the low level, thereby executing the charging at a high speed. The high speed charging circuit 122 has an NAND gate to which the control signals E12 and E13 are supplied, a transistor switch which is turned on/off by an output of the NAND gate, and a current limiting circuit to limit the charge current to a predetermined high speed charging current value in the ON state of the transistor switch.

The analog switch 128 operates by the positive logic. When the output current detected by the output current detecting circuit 150 exceeds the threshold current Ith= 1 mA, the control signal E13 changes from the low level to the high level. Due to this, the operation of the high speed charging circuit 122 is stopped, the analog switch 128 is turned on at the same time, and the trickle charging of the battery pack 112 via the trickle resistor 126 is started. The trickle charging is a charging for flowing a charge current which is determined by a resistance value of 470 Ω of the trickle resistor 126 according to the voltage difference between the input voltage from the AC adapter and the present charging voltage of the battery pack 112.

The charging operation of the charge control section 182 is stopped in either one of the following cases: namely, when a predetermined time by a timer activated at the start of the charging, for example, 1.2 hours of the high speed charging elapses; when an abnormal temperature is detected by the thermistor 164 provided for the battery pack 112; and further, when the full charging is detected on the basis of a change in charging voltage of the battery pack 112.

In order to recognize such a state of the battery pack on the microprocessor 130 side, an AD converter 156 to detect a battery current, an AD converter 158 to detect a temperature, an AD converter 160 to detect a battery voltage, and an AD converter 162 to detect the presence or absence of battery are provided. The AD converter 156 to detect the battery current receives a voltage across the sense resistor 116 provided for the discharge circuit and supplies a voltage detection signal E4 which was digital converted to the microprocessor 130. The AD converter 158 to detect the temperature supplies a temperature detection signal E5 based on the thermistor 164 built in the battery pack 112 to the microprocessor 130. The AD converter 160 to detect the battery voltage supplies a voltage detection signal E6 obtained by converting the charging voltage of the battery pack 112 to the microprocessor 130. Further, the AD converter 162 to detect the presence or absence of the battery supplies a detection signal E7 indicative of the presence or absence of the connection of the battery pack 112 to the microprocessor 130.

Further, by pulling the signal line which was pulled up through a resistor 166 to the power source voltage +Vcc1 into the battery pack 112 as shown by a broken line, a detection signal E8 by a leakage of the battery pack 112 is supplied to the microprocessor 130. For example, when moisture or water enters the battery pack 112, a short current flows through the resistor 166 and the leak detection signal E8 drops to 0 V. Therefore, the microprocessor 130 can detect a short-circuit of the battery pack 112 by such a voltage drop.

The display control section 186 provided in the microprocessor 130 executes a display control of the LED display section 30. Five LEDs 170, 172, 174, 176, and 178 are provided in the LED display section 30 and are driven by control signals E15, E16, E17, E18, and E19. The display control section 186 operates and drives the display section 30 during the ON operation of an LED switch 28. The LED switch 28 is pulled up to the power source Vcc1 through a resistor 168. At the OFF time when the LED switch 28 is not operated, a switch signal E14 is at the high level because of the power source voltage Vcc1. When the LED switch 28 is turned on, the switch signal E14 is set to the low level, so that the display control section 186 operates. The LED 170 is lit on by the control signal E15 when the input of DC 15 V by the AC adapter is detected. The LEDs 172, 174, and 176 are sequentially lit on by the control signals E16 to E18 in accordance with the magnitude of the charging voltage of the battery pack 112. For example, the three LEDs 172, 174, and 176 are lit on by the full charge of the battery pack 112, the two LEDs 174 and 176 are lit on when the voltage is low. Only the LED 176 is lit on when the voltage is further low. Further, the LED 178 flickers by the control signal E19 when the decrease in the battery voltage is detected. Therefore, when the LED 178 flickers by the turn-on of the LED switch 28, it will be understood that it is necessary to charge.

The operation of the microprocessor 130 is executed by using clocks of 1.8 MHz and 32 KHz from quarts oscillators 152 and 154 provided in the outside. For example, a microprocessor of four bits is used as a microprocessor 130.

Figure 9:
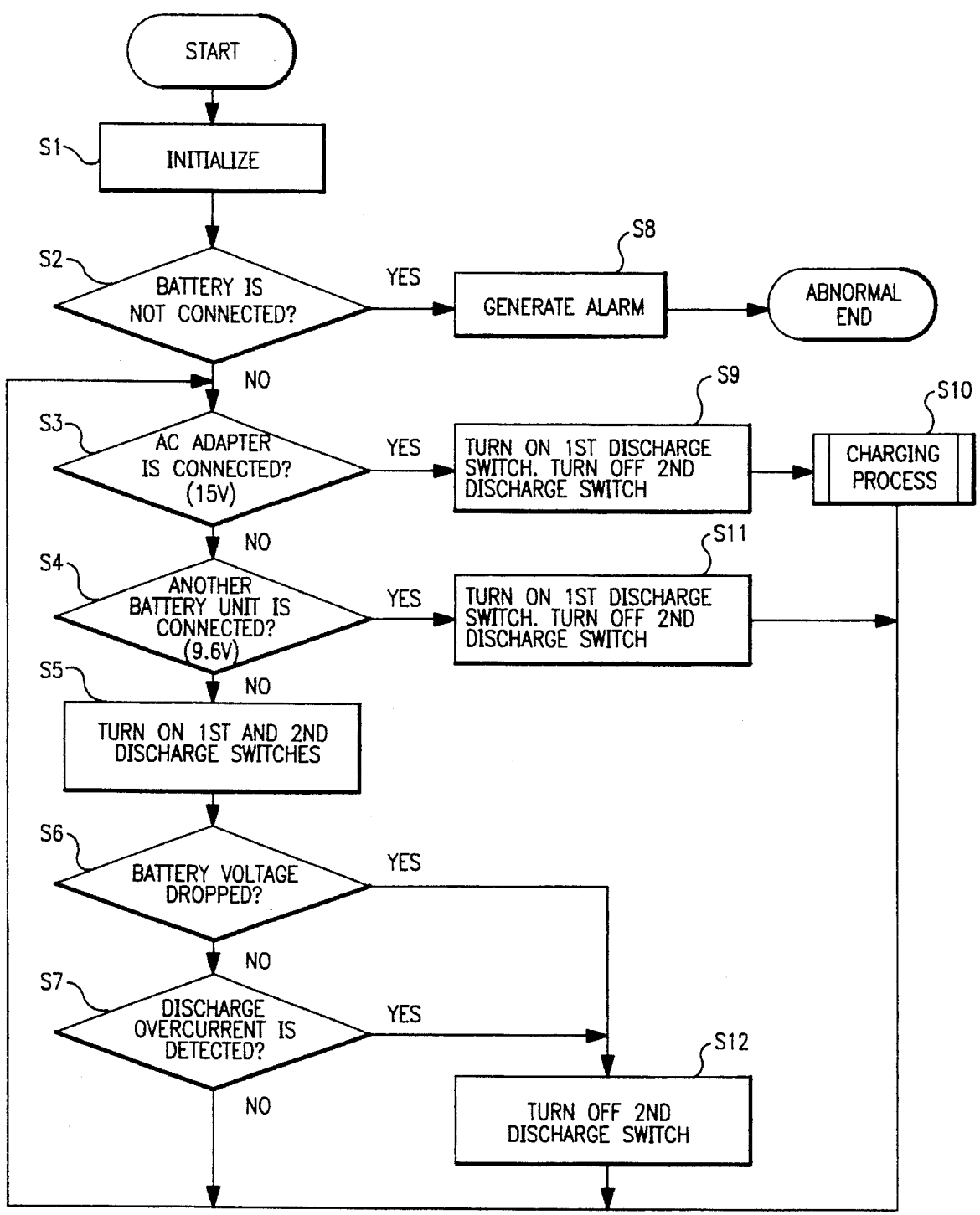
FIG. 9 is a flowchart showing a processing operation of FIG. 8.

The flowchart of FIG. 9 shows a processing operation by the microprocessor 130 provided in FIG. 8.

When the power source voltage exceeding 4 V is supplied, the switching circuit 132 is turned on and supplies the power source voltage to the regulator 134. By receiving the power on reset signal E1 from the resetting circuit 138, the microprocessor 130 executes the initialization in step S1. Subsequently, a check is made to see if the battery pack 112 is not connected or not in step S2. If the battery pack 112 is not connected, an alarm is generated in step S8 and the processing routine is finished as an abnormal state. When the battery pack 112 is normally connected, step S3 follows and a check is made if an AC adapter has been connected or not. Specifically speaking, it is judged that the AC adapter is connected when the input voltage is equal to DC 15 V due to the voltage detection signal E2 from the voltage detecting circuit 144. When the AC adapter is connected, step S9 follows. The analog switch 106 as a first discharge switch is turned on and the analog switch 118 as a second discharge switch is turned off. The processing routine advances to a charging process in step S10. The details of the charging process in step S10 are shown as a subroutine in FIG. 10.

In the case where it is judged that no AC adapter is connected in step S3, step S4 follows and a check is made to see if another auxiliary battery unit has been connected or not. When the another auxiliary battery unit is connected, the input detection voltage by the voltage detecting circuit 144 is equal to DC 9.6 V. When the connection of another auxiliary battery unit is judged, in step S11, the analog switch 106 as a first discharging switch is turned on in a manner similar to the case in step S9, the analog switch 118 as a second discharging switch is turned off, the supplied voltage from another auxiliary battery unit inputted from the input connector 50 is supplied to the output connector 52 as it is through the analog switch 106 which is in the ON state.

When another battery unit is not connected in step S4, namely, when the input detection voltage is equal to 0 V, step S5 follows. The analog switches 118 and 106 as first and second discharging switches are turned on respectively. Due to this, a discharging circuit from the battery pack 112 to the output connector 52 is formed and a discharging state using the self battery pack 112 is obtained.

When the discharging state is established in step S5, a drop of the battery voltage is discriminated in step S6 and an overcurrent is detected in step S7. When the drop of the battery voltage or the overcurrent is detected, step S12 follows and the analog switch 118 as a second discharging switch is turned off and the discharging operation of the battery pack 112 is stopped. As for the stop of the discharging due to the drop of the battery voltage in step S6, in addition to the process of the microprocessor 130, when the input voltage of the switching circuit 132 provided in the power source circuit section is equal to or less than 4 V, the power supply to the regulator 134 is cut off. Due to this, the operation of the whole circuit section including the microprocessor 130 is stopped, the discharging of the battery pack 112 is substantially stopped, thereby preventing a damage of the battery pack 112 by the excessive discharge.

Figure 10:
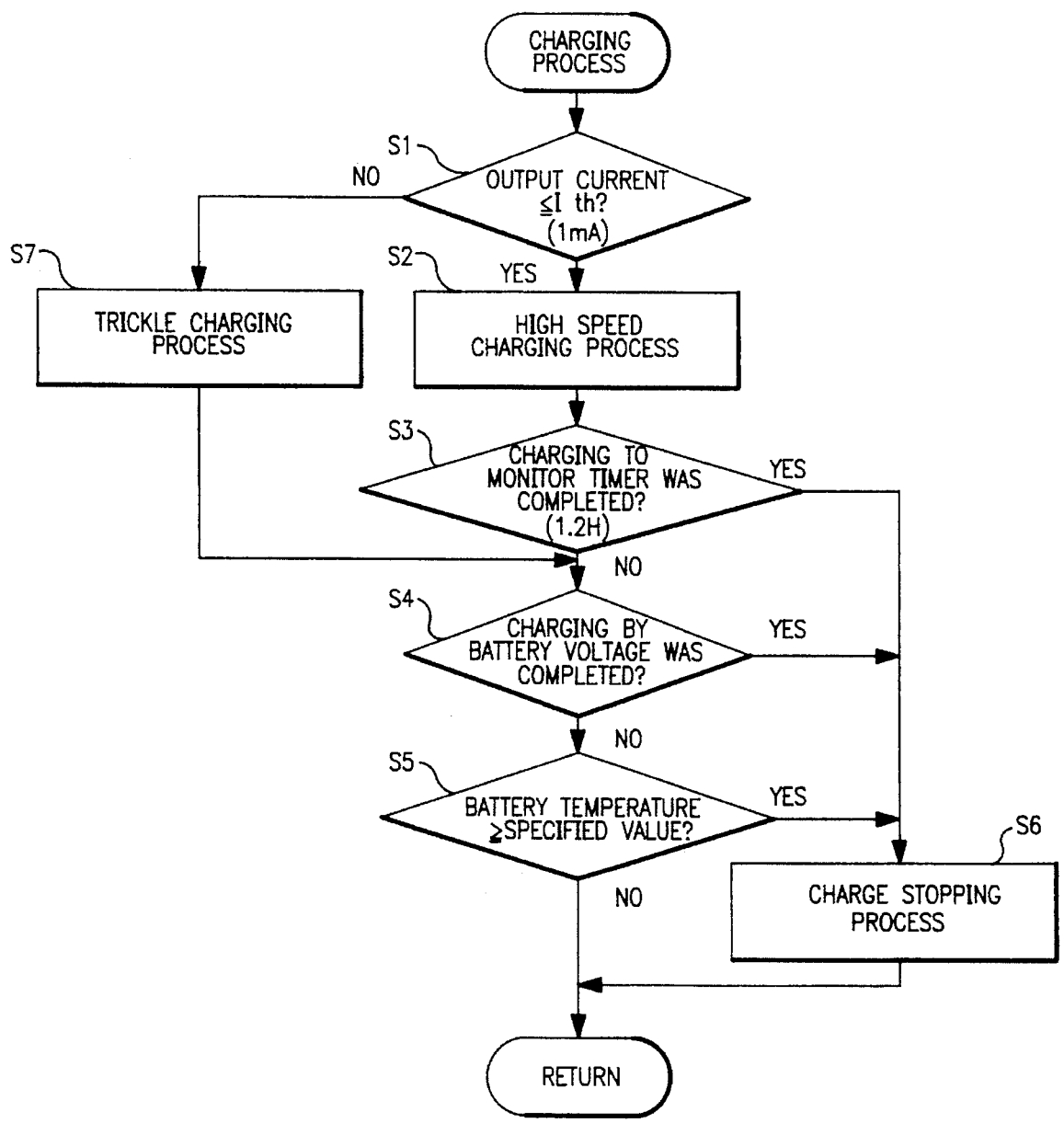
FIG. 10 is a flowchart showing the details of a charging process of FIG. 9.

FIG. 10 shows details of the charging process shown in step S10 in FIG. 9 as a subroutine. When the microprocessor 130 detects the connection of the AC adapter, the charging process in FIG. 10 is started. In step S1, a check is first made to see if the output current detected by the output current detecting circuit 150 is equal to or less than the threshold current Ith or not. For example, when Ith= 1 mA and the output current is equal to or less than 1 mA, step S2 follows and the high speed charging circuit 122 is operated and the high speed charging process is started. During the high speed charging, in step S3, a check is made to see if the charging has been completed or not by discriminating whether the timer activated by the start of the charging has reached a set time, for example, 1.2 hours or not. In step S4, a completion of the charging is judged on the basis of the battery voltage. In case of using an NiCd cells 114 as a battery pack 112, the charging voltage increases in association with the elapse of time and it starts to drop when it is fully charged. Therefore, in step S4, it is judged that the charging has been completed when the value of a negative time change ratio due to a decrease in charging voltage exceeds a predetermined threshold value. Further in step S5, a check is made to see if the detection temperature by the thermistor 164 provided in the battery pack 112 is equal to or higher than a specified value or not. Since there is a fear such that when the charging of the battery pack 112 is suddenly executed, the internal temperature rises and the NiCd cell itself is damaged, the charging is stopped when the detection temperature is equal to or higher than the specified value. When one of the results of the judgment in steps S3, S4, and S5 is obtained, step S6 follows and a charge stopping process to stop the operation of the high speed charging circuit 122 is executed. Such a high speed charging process is executed in a stand-by mode in which the personal computer 10 is not used.

On the other hand, when the personal computer 10 is used, the output current exceeds the threshold value Ith. In this case, the processing routine advances from step S1 to step S7 and a trickle charging process is executed. That is, the operation of the high seed charging circuit 122 is stopped and at the same time, the analog switch 128 is turned on. The trickle charge is executed by the charging current according to the resistance value of 470 Ω of the trickle resistor 126 and a voltage difference between the supply voltage of the AC adapter at that time and the charging voltage of the battery pack 112. With respect to the trickle charge, a check is also made to see if there is abnormality due to the completion of the charging by the battery voltage in step S4 or the increase in battery temperature in step S5. When one of the above conditions is judged, a charge stopping process is executed in step S6.

Figure 11:
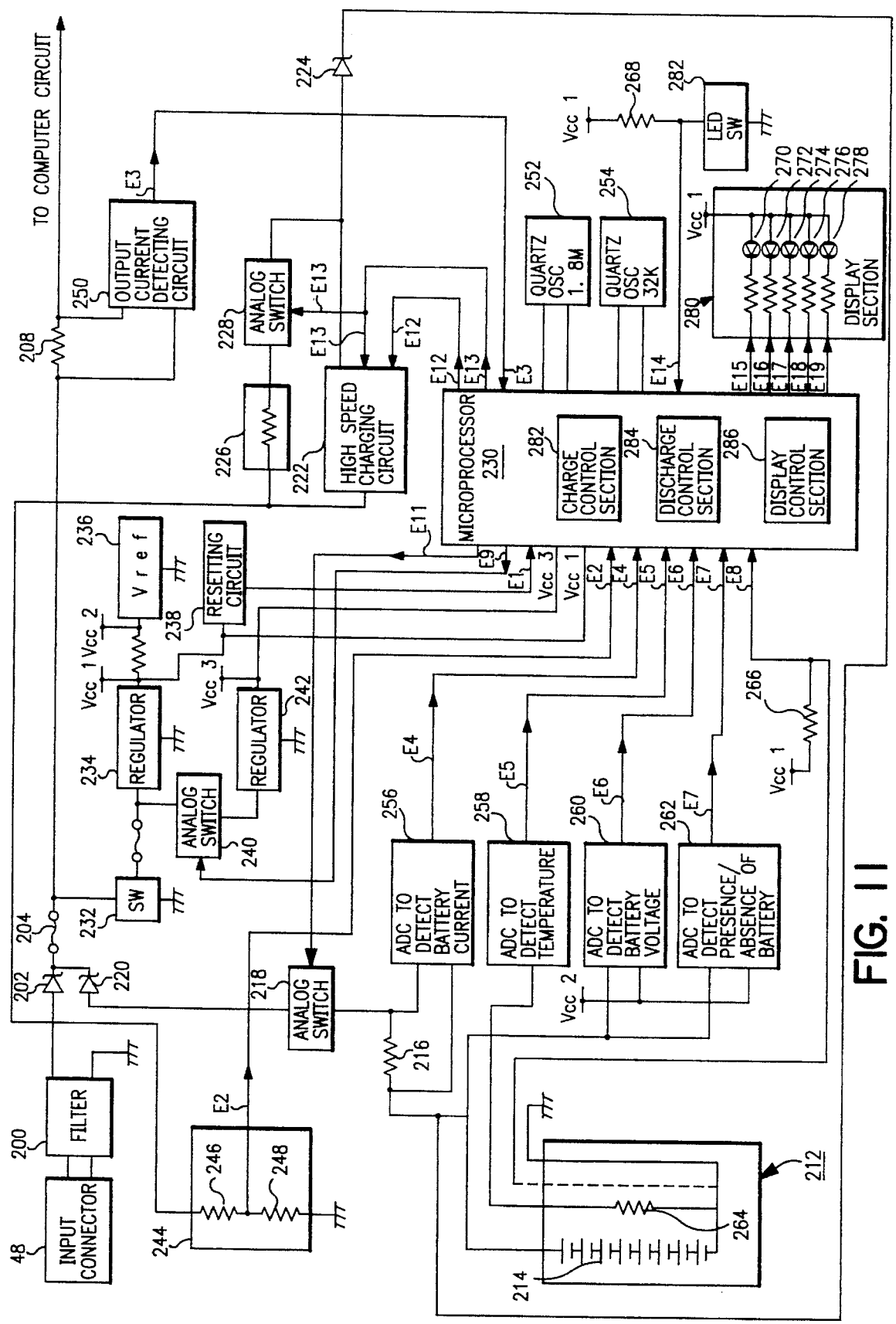
FIG. 11 is a circuit block diagram showing an embodiment of a battery circuit section built in a computer in FIG. 8.

FIG. 11 shows the power source circuit section 46 provided in the personal computer 10 shown in FIG. 7. The power source circuit section 46 which is provided in the personal computer is a circuit from which the analog switch 106 as a first discharge switch provided in the battery circuit section of the auxiliary battery unit shown in FIG. 8 is eliminated and other circuit construction is substantially the same. Therefore, in FIG. 11, the same component elements as those shown in FIG. 8 are designated by substantially the same reference numerals with respect to the unit digit and the tenth digit except that the hundredth digit is changed from "1" to "2". For example, the noise filter 100 provided subsequently to the input connector 50 in FIG. 8 is shown as a noise filter 200 in FIG. 11.

Figure 12:
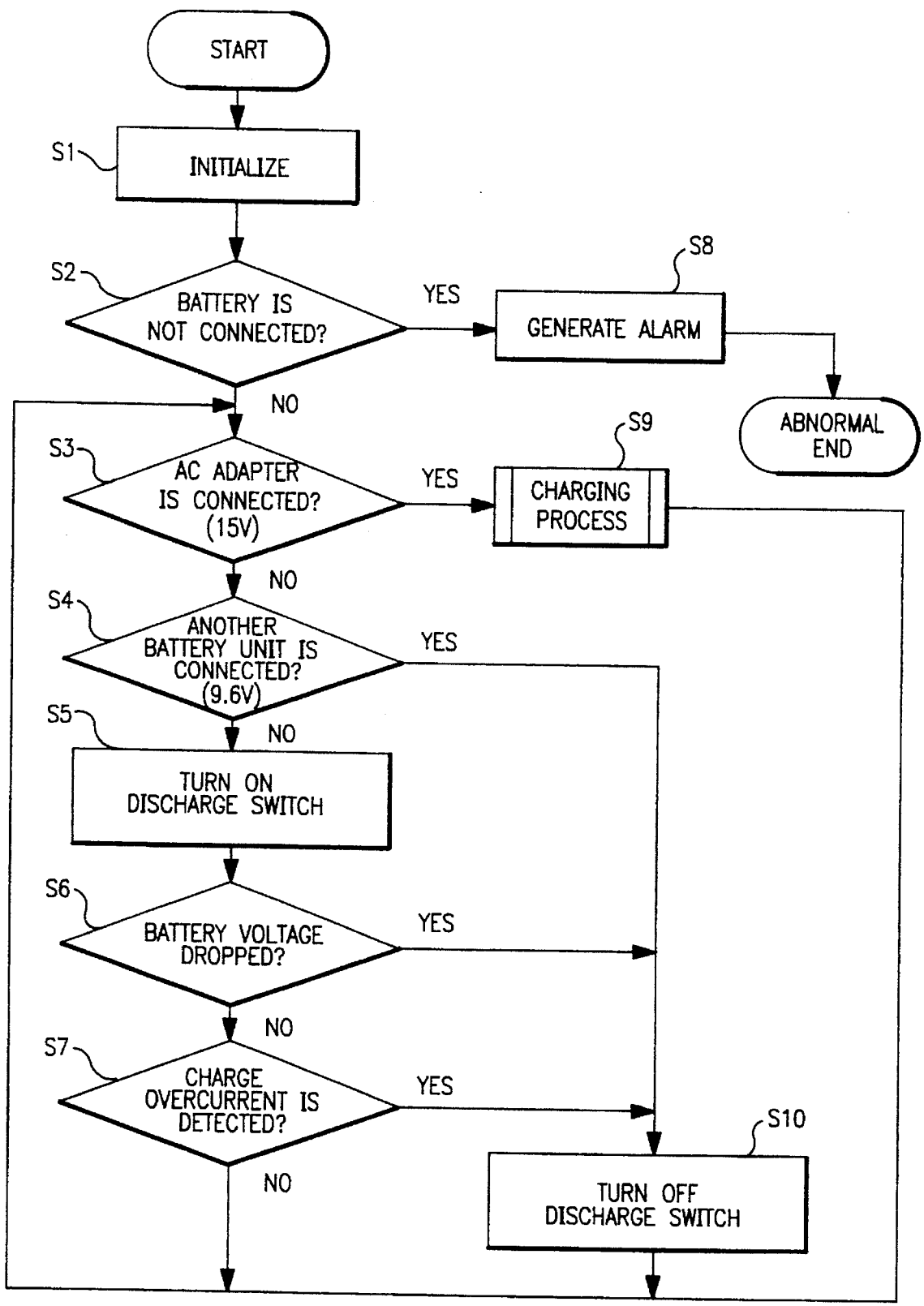
FIG. 12 is a flowchart showing a processing operation of FIG. 11.

FIG. 12 is a flowchart showing the processing operation of the power source circuit section provided in the personal computer in FIG. 11. The flowchart of FIG. 12 corresponds to the flowchart of FIG. 9 regarding the auxiliary battery unit. The processes in steps 9 to 11 in FIG. 9 are eliminated and the ON operations of the first and second discharge switches in step S5 is changed to the ON operation of a single discharge switch. That is, the power source circuit section in FIG. 11 provided in the personal computer executes the discharge control only by the analog switch 218 provided in the discharging line of the battery pack 112. Due to this, in the case where the input voltage from the input connector 48 is set to DC 15 V and a connecting state of the AC adapter is judged or the input voltage is set to DC 9.6 V and it is judged as a supplied voltage from the auxiliary battery unit, an analog switch 218 is turned off and the discharging of the self battery pack 212 is disconnected. When the input voltage from the input connector 48 is equal to 0 V, the analog switch 218 is turned on, thereby discharging from the self battery pack 212.

Figure 13:
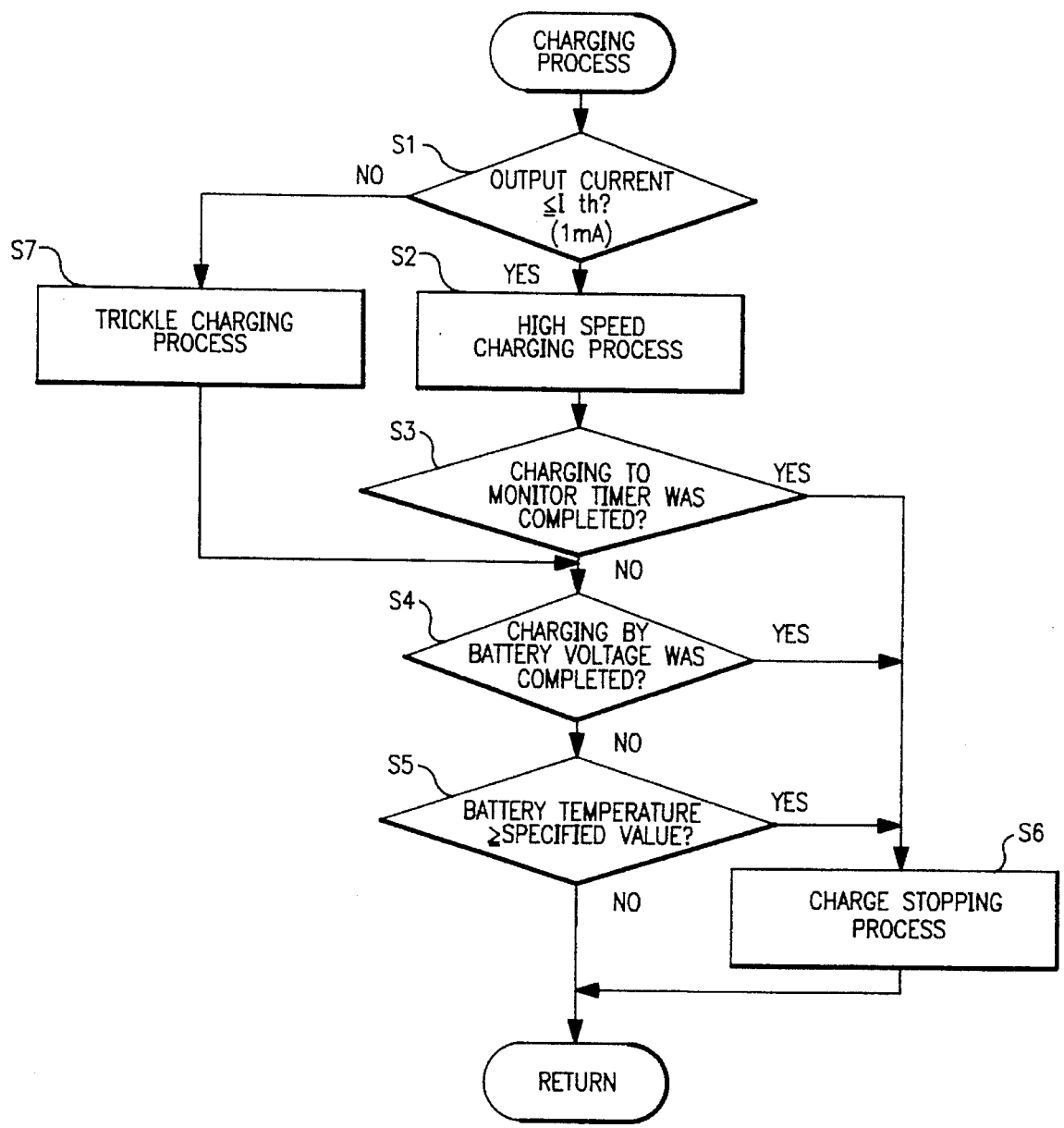
FIG. 13 is a flowchart showing the details of a charging process of FIG. 12.

FIG. 13 shows the charging process by the power source circuit section provided in the personal computer shown in step S9 in FIG. 12 as a subroutine. The charging process is substantially the same process as that in the case of the auxiliary battery unit shown in FIG. 10.

The charging operation and discharging operation as a whole system when the two auxiliary battery units 16-1 and 16-2 are connected to the personal computer 10 as shown in FIG. 7 will now be described. The charging operation is executed by connecting the AC adapter 42 to the last auxiliary battery unit 16-2. The AC adapter 42 generates DC 15 V, the battery circuit sections 52-2 and 52-1 of the auxiliary battery units 16-1 and 16-2 detect the connection of the AC adapter 42 from the input voltage of DC 15 V, respectively, and the charging control section is set into the operating mode. Similarly, the power source circuit section 46 of the personal computer 10 also recognizes the connection of the AC adapter 42 from the input voltage of DC 15 V and sets the charging control section into the operating mode. When it is now assumed that the computer circuit 44 is in a stand-by mode, the high speed charging is executed first to the battery pack 212 of the power source circuit section 46 provided in the personal computer 10 by the charging control of each of the power source circuit section 46 and the battery circuit sections 52-1 and 52-2. The current due to the high speed charging is detected by the auxiliary battery units 16-1 and 16-2, and since the current exceeds the threshold current Ith, the trickle charging state is obtained. That is, the high speed charging is started from the power source circuit section 46 of the personal computer 10.

When the high speed charging of the battery pack by the power source circuit section 46 of the personal computer 10 is completed, the output current flowing in the auxiliary battery units 16-1 and 16-2 becomes the stand-by current of the personal computer 10 again. Each of those units starts the charging operation again. However, the output current flowing by the charging start of the auxiliary battery unit 16-1 locating on the personal computer 10 side is detected by the auxiliary battery unit 16-2 and the charging mode is switched to the trickle charging. Due to this, when the high speed charging of the personal computer 10 is completed, the high speed charging of the auxiliary battery unit 16-1 is started subsequently. When the high speed charging of the auxiliary battery unit 16-1 is finished, the charging mode is finally switched to the high speed charging of the auxiliary battery unit 16-2.

When the personal computer 10 enters the operating mode and the output current increases during the high speed charging in either one of the personal computer 10 and the auxiliary battery units 16-1 and 16-2, the charging mode is switched from the high speed charging to the trickle charging at that time point. Therefore, each of the charging operations can be sequentially executed while using the personal computer 10.

The discharge control in a state in which the AC adapter 42 is detached will now be described. In a state in which the AC adapter 42 is detached, the input voltage of the input connector 50-2 of the auxiliary battery unit 16-2 on the outermost side is equal to 0 V. Due to this, the battery circuit section 52-2 allows self battery pack to be discharged. In the auxiliary battery unit 16-1 on the personal computer 10 side, since the input voltage of the input connector 50-1 is equal to DC 9.6 V by the connection of the auxiliary battery unit 16-2, the battery circuit section 52-1 detaches the self battery pack and the battery voltage of 9.6 V from the auxiliary battery unit 16-2 is supplied as it is to the personal computer 10. In the power source circuit section 46 provided in the personal computer 10, since the input voltage of the input connector 48 is equal to DC 9.6 V, the power source circuit section 46 detaches self battery pack 212 and supplies 9.6 V supplied from the outside to the computer circuit 44 as it is as a power source voltage.

When the discharging of the auxiliary battery unit 16-2 is finished, specifically speaking, when the battery voltage is dropped to 4 V or less, the input voltage to the input connector 50-1 of the auxiliary battery unit 16-1 becomes 0 V due to the detachment of the battery pack. Therefore, the battery circuit section 52-2 discharges and connects the self battery pack, thereby supplying DC 9.6 V to the personal computer 10. The power source circuit section 46 of the personal computer 10 is still in a state in which the discharging of the self battery pack is detached.

When the discharging of the auxiliary battery unit 16-1 is finished, specifically speaking, when the discharging voltage is lower than 4 V, the input voltage of the input connector 48 of the personal computer 10 is equal to 0 V due to the detachment of the battery unit. Therefore, the discharging operation of the power source circuit section 46 is executed, the self battery pack is connected to the discharging line and the discharging to supply a power source to the computer circuit 44 is started. As mentioned above, the discharging operation is executed sequentially from the auxiliary battery unit 16-2 connected on the outermost side from the personal computer 10.

The maximum value (n) of the auxiliary battery units which can be connected to the personal computer 10 is set to the maximum value (n) which satisfies the following equation since when the power source is lower than the necessary power source voltage, the personal computer 10 is stopped.

$$V_{AC} - V_F \times n > V_{dd}$$

Where, $V_{AC}$ denotes an output voltage of the AC adapter, $V_F$ denotes a drop voltage by the auxiliary battery unit, and $V_{dd}$ indicates an input power source voltage which is necessary for the personal computer 10. For instance, when it is now assumed that $V_{AC}$=15 V, $V_F$=1 V, and $V_{dd}$=9 V, n< 6 is obtained. Maximum six auxiliary battery units can be connected.

Figure 14:
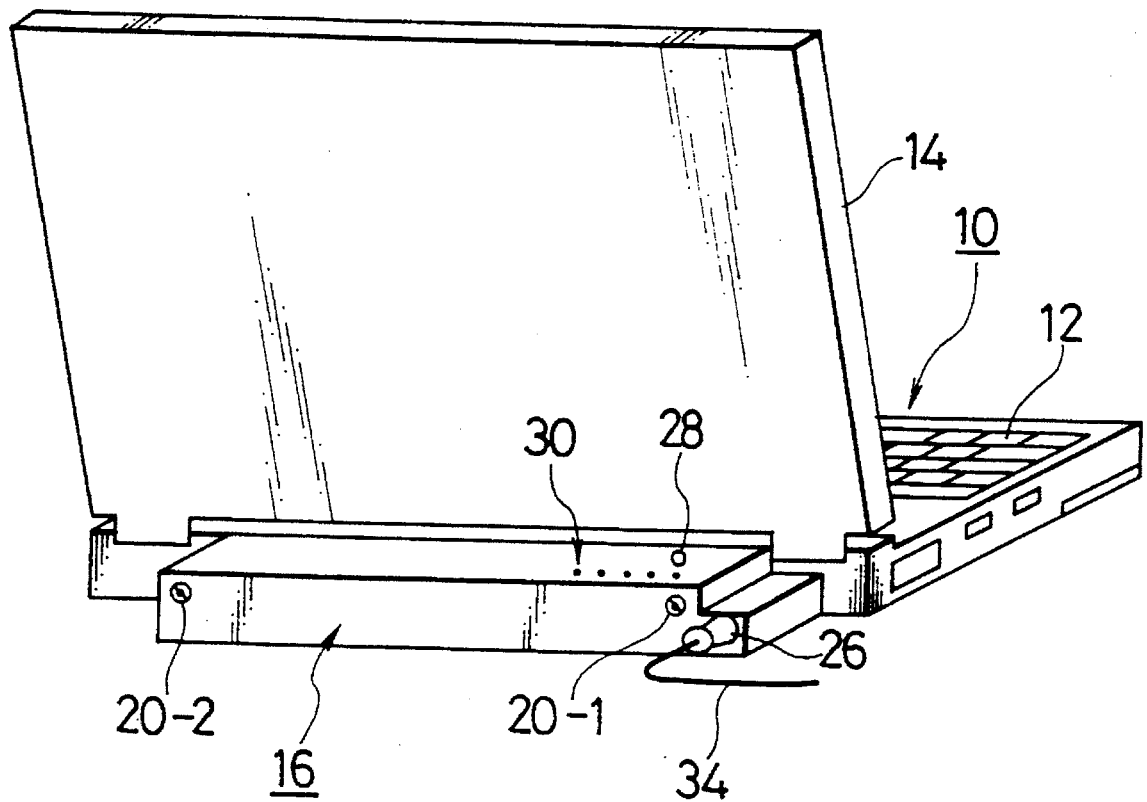
FIG. 14 is an explanatory diagram showing an embodiment of the modified invention in which a single auxiliary battery unit is connected to the computer.

FIG. 14 shows a modified embodiment of the invention. In the embodiment of FIG. 14, it is characterized in that only one auxiliary battery unit 16 is provided for the personal computer 10. The auxiliary battery unit 16 has the same structure as that of one of the auxiliary battery units shown in FIG. 1.

Figure 15:
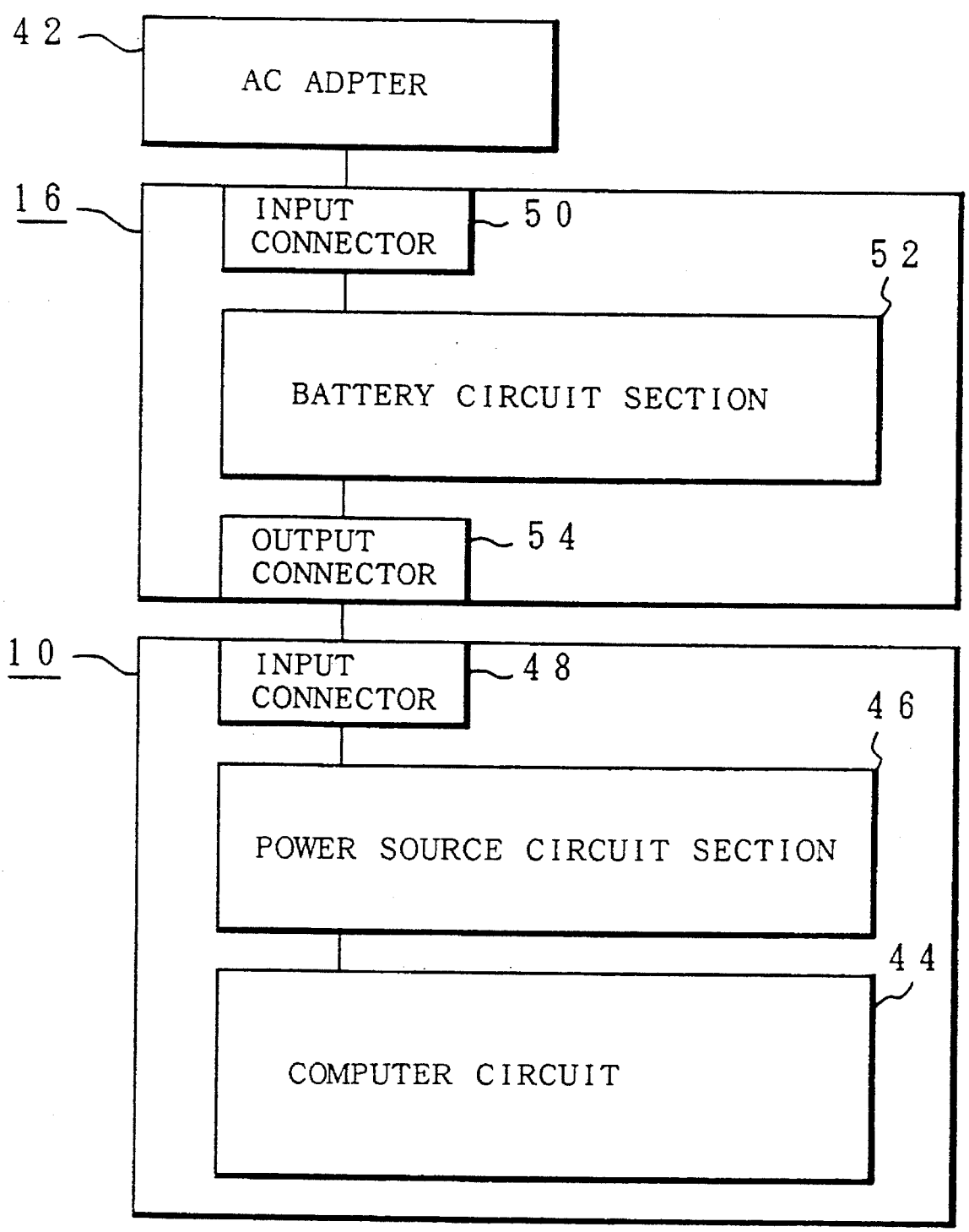
FIG. 15 is a block diagram showing a system construction of FIG. 14.

FIG. 15 shows a system construction in the modified invention of FIG. 14. The personal computer 10 has the computer circuit 44, power source circuit section 46, and input connector 48 in a manner similar to FIG. 7. The auxiliary battery unit 16 has the input connector 50, battery circuit section 52, and output connector 54. When charging, the AC adapter 42 is connected to the input connector 50 of the auxiliary battery unit 16. The battery circuit section 52 of the auxiliary battery unit 16 has a circuit construction shown in FIG. 16.

Figure 16:
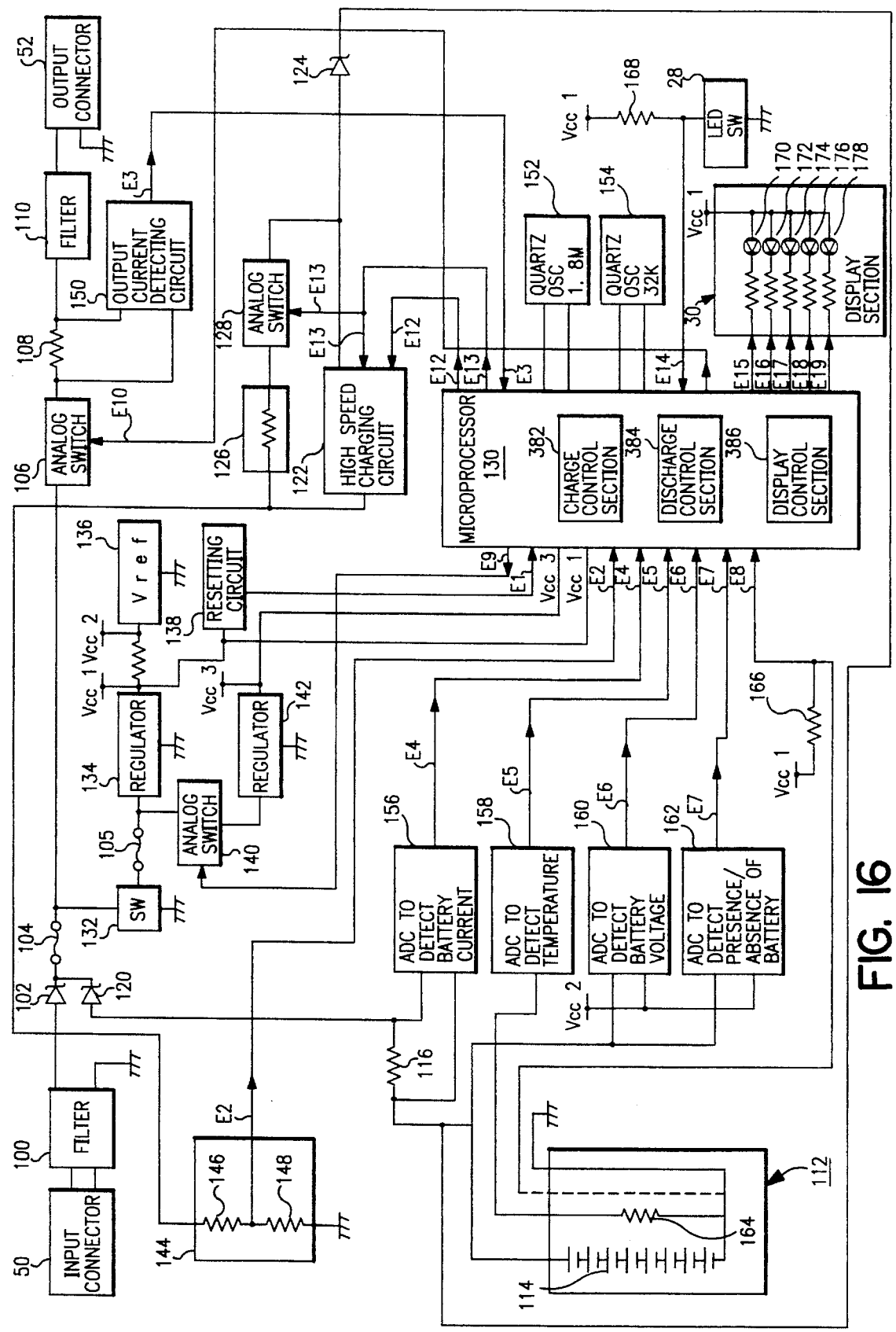
FIG. 16 is a circuit block diagram showing an embodiment of a battery circuit section of a spare battery unit.

In the single auxiliary battery unit shown in FIG. 16, the analog switch 118 provided in the discharging line of the battery pack 112 in the auxiliary batter unit in the case where a plurality of auxiliary battery units are connected is eliminated. The discharging control is executed only by the analog switch 106 provided between the input connectors 50 and 52. Since the other circuit construction is similar to that in the embodiment of FIG. 8, the same component elements are designated by the same reference numerals. A charge control section 382, a discharge control section 384, and a display control section 386 which are realized by a program control are provided for the microprocessor 130.

When the circuit of only one auxiliary battery unit provided for the personal computer 10 in FIG. 16 is compared with the power source circuit section provided in the personal computer 10 shown in FIG. 11, only the single analog switches 106 and the single analog switch 218 are provided as discharging switches for both of them, and the processes of the charge control sections 282 and 382 are almost the same although the positions of the analog switches are different.

Figure 17:
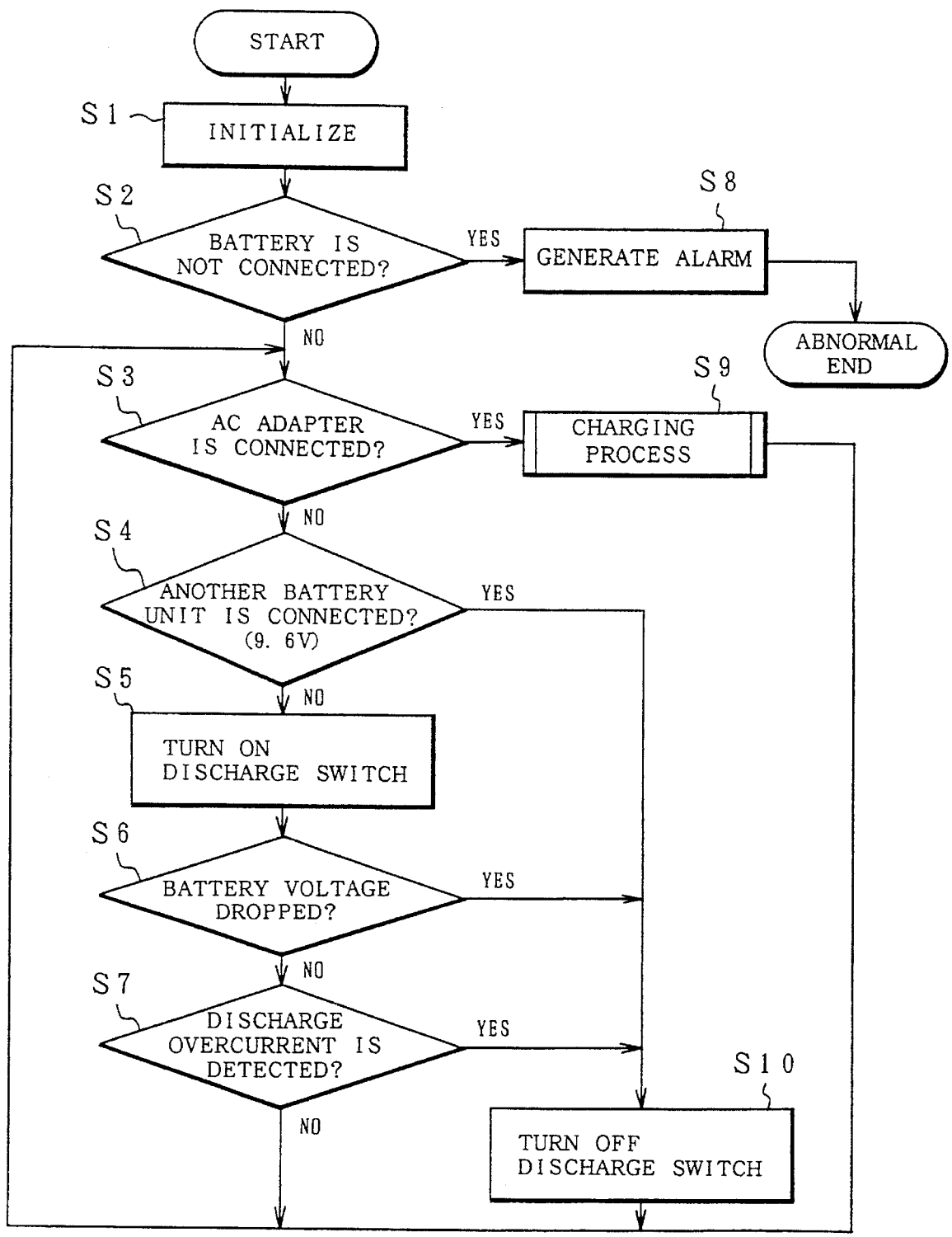
FIG. 17 is a flowchart showing a processing operation of FIG. 16.
Figure 18:
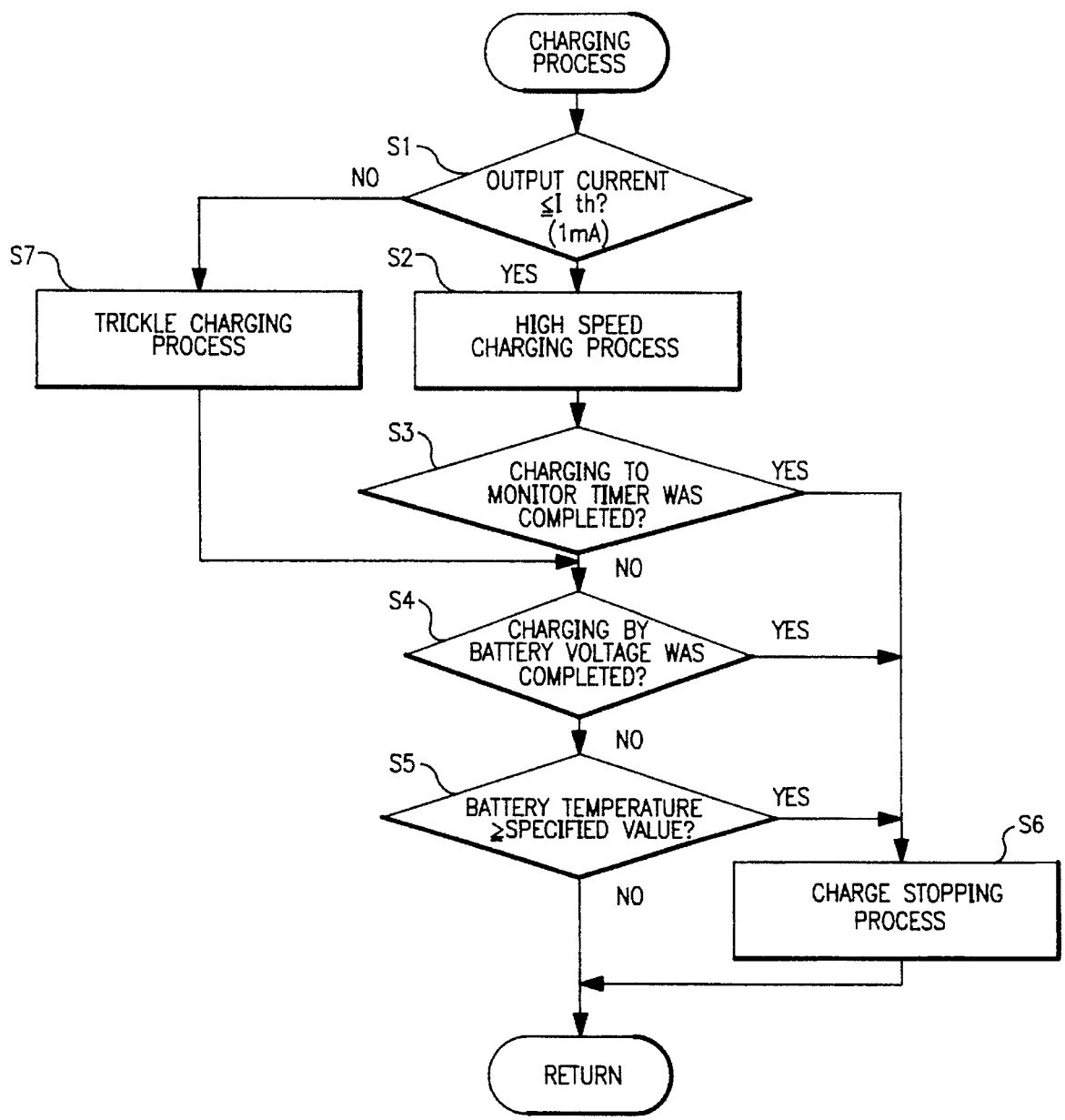
FIG. 18 is a flowchart showing the details of a charging process of FIG. 17.

FIG. 17 shows the processing operation in the auxiliary battery unit in FIG. 16. The processing operation itself is substantially the same as that of FIG. 12 except that the discharging switch in each of steps S5 and S10 is replaced to the analog switch 106 in the case of FIG. 16 and the analog switch 218 in the case of FIG. 11. With respect to FIG. 18 in which the charging process in step S9 in FIG. 17 is shown as a subroutine, the process is almost the same as that shown in FIG. 13.

In the operation of a whole system shown in FIG. 15, the battery pack of the power source circuit section 46 of the personal computer 10 is first charged and the battery pack of the battery circuit section 52 of the auxiliary battery unit 16 is subsequently charged. On the other hand, the discharging operation is started from the battery pack of the auxiliary battery unit 16 and when discharging of the auxiliary battery unit 16 is finished, the discharging mode is switched to the discharging from the battery unit of the power source circuit section 46. That is, with respect to the charging and discharging as well, the charging and discharging operations are executed in accordance with almost the same order as that in case of a plurality of auxiliary battery units which can be connected as mentioned above.

Although the above embodiment has been described with respect to the case where the NiCd cells are used in the battery pack as an example, it is also possible to use other chargeable battery cells.

As a process to judge a full charging from the charging voltage in the charge control, a phenomenon which is peculiar to the NiCd cell such that the charging voltage which has risen is decreased by the completion of the charging is captured and judged. With respect to the other kinds of battery cells, it is sufficient to judge the full charging from a change in charging voltage according to charging characteristics which are peculiar to the cells.

Further, the invention is not limited by the numerical values shown in the above embodiments.

What is claimed is:

1. A power source system of an information processing system, comprising:

a portable system main body having power source circuit means;

a plurality of auxiliary battery units which are connected and fixed to a casing of said system main body and are electrically connected in series to a power source input terminal of said power source circuit means; and battery circuit means mounted within each auxiliary battery unit for sequentially charging each of said auxiliary battery units starting from the auxiliary battery unit located on the system main body side and for sequentially discharging each of said auxiliary battery units starting from the auxiliary battery unit located on the side farthest from said system main body.

2. A system according to claim 1, wherein each of said auxiliary battery units comprises:

a battery pack in which a plurality of battery cells connected in series are enclosed;

an input terminal electrically connected to said battery pack and electrically connected to an output terminal of a second auxiliary battery unit or an output terminal of AC adapter means which converts AC power to DC power;

an output terminal electrically connected to said battery pack and to an input terminal of the second auxiliary battery unit or said power source input terminal of said power source circuit means;

voltage detecting means for detecting an input power source voltage from said input terminal;

current detecting means for detecting an output current to said output terminal;

first discharge switching means for turning ON/OFF the electrical connection to said output terminal;

second discharge switching means for turning ON/OFF the electrical connection from said battery pack;

charge switching means for turning ON/OFF the electrical connection from said input terminal to said battery pack;

charge control means for detecting the electrical connection of said AC adapter means to the input terminal from the detection voltage of said voltage detecting means and for turning ON said charge switching means; and discharge control means for turning ON said first discharge switching means and turning OFF said second discharge switching means and supplying external power to the auxiliary battery unit when the electrical connection of said AC adapter means or the second auxiliary battery unit is detected from the detection voltage of said voltage detecting means, and for turning ON said first and second discharge switching means and supplying power from said battery pack to the auxiliary battery unit at the front stage when non-electrical connection of said AC adapter means or the second auxiliary battery unit is detected from the detection voltage of said voltage detecting means.

3. A system according to claim 2, wherein said charge switching means comprises:

high speed charging means for supplying a current near a maximum allowable charge current of said battery pack and for charging at a high speed; and trickle charging means electrically connected in parallel to said high speed charging means for supplying an arbitrary current which is determined by a voltage difference between said input power source voltage and the charging voltage of said battery pack and a specified resistance value, wherein said charge control means makes said high speed charging means operative when the detection current of said current detecting means is equal to or less than a predetermined value in a state in which the electrical connection of said AC adapter means is detected, thereby charging at a high speed, and makes said trickle charging means operative when the detection current exceeds the predetermined value, thereby trickle charging.

4. A system according to claim 2, wherein said charge control means turns OFF said charge switching means and stops charging when an elapsed time of a timer which was activated at the start of the charging reaches a predetermined time.

5. A system according to claim 2, wherein said charge control means turns OFF said charge switching means and stops charging when a detection temperature by temperature detecting means provided for said battery pack exceeds a predetermined temperature.

6. A system according to claim 2, wherein said charge control means monitors the power source voltage of the battery pack and in a case where a change such that the voltage which rises in association with the charging exceeds a peak voltage and decreases is detected, the charge control means turns OFF the charge switching means, and stops the charging.

7. A system according to claim 1, further comprising display means for indicating a state of the auxiliary battery unit.

8. A system according to claim 7, wherein said display means displays at least an inputting state of the external power source for the input terminal, a charging state, and a state of the battery voltage.

9. A system according to claim 7, wherein said display means has display switching means for displaying information only during an ON operation.

10. A system according to claim 2, wherein said discharge control means turns off the second discharge switching means and disconnects the battery pack in the case where the discharge current of the battery pack is detected and is equal to an overcurrent.

11. A system according to claim 2, wherein said discharge control means turns off the first and second discharge switching means and shuts off the power supply to the unit at the front stage in the case where the discharge voltage of the battery pack is detected and is equal to or less than a specified voltage.

12. A system according to claim 1, wherein said power source circuit means of said system main body comprises:

a battery pack in which a plurality of battery cells electrically connected in series are enclosed;

a power source input terminal to which an output terminal of another auxiliary battery unit or an output terminal of an AC adapter means for converting AC power into DC power;

an output terminal to supply a power source to a main body circuit section;

voltage detecting means for detecting an input voltage from said input terminal;

current detecting means for detecting an output current to said output terminal;

discharge switching means for turning ON/OFF the electrical connection from said battery pack;

charge switching means for turning ON/OFF the electrical connection from said power source input terminal to said battery pack;

charge control means for detecting the electrical connection of said AC adapter means from the detection voltage of said voltage detecting means and for turning ON said charge switching means and charging said battery pack only in the case where the detection current of said current detecting means is equal to or less than a predetermined value; and discharge control means for turning OFF said discharge switching means and electrically disconnecting said battery pack in the case where the electrical connection of the AC adapter means or the auxiliary battery unit is detected from the detection voltage of said voltage detecting means and for turning ON the discharge switching means and supplying the power source from the battery pack to the main body circuit section in the case where the non-electrical connection of the AC adapter means or the auxiliary battery unit is detected from the detection voltage of said voltage detecting means.

13. A system according to claim 12, wherein said charge switching means comprises:

high speed charging means for supplying a current near a maximum allowable charge current of said battery pack and charging at a high speed; and trickle charging means electrically connected in parallel to said high speed charging means for charging the battery pack by an arbitrary current which is determined by a voltage difference between the input power source voltage and the charging voltage of said battery pack and a specified resistance value; and wherein said charge control means makes the high speed charging means operative when the detection current of said current detecting means is equal to or less than a predetermined value in a state in which the electrical connection of the AC adapter means is detected, thereby charging at a high speed, and also makes said trickle charging means operative when said detection current exceeds said predetermined value, thereby trickle charging.

14. A system according to claim 12, wherein said charge control means turns OFF said charge switching means and stops the discharging when an elapsed time of a timer activated at the start of the charging reaches a predetermined time.

15. A system according to claim 12, wherein said charge control means turns OFF said discharge switching means and stops the discharging when a detection temperature by temperature detecting means provided for said battery pack exceeds a predetermined temperature.

16. A system according to claim 12, wherein said charge control means monitors the power source voltage of said battery pack and, when a change such that the voltage which rises in association with the charging exceeds a peak voltage and decreases is detected, said charge control means turns OFF said discharge switching means and stops the discharge.

17. A system according to claim 12, further comprising display means for indicating a state of said power source circuit means.

18. A system according to claim 17, wherein said display means displays at least an inputting state of the external power source for said input terminal, a charging state, and a state of the battery voltage.

19. A system according to claim 17, wherein said display means has display switching means for displaying information only during an ON operation.

20. A system according to claim 12, wherein said discharge control means turns OFF said discharge switching means and electrically disconnects said battery pack in the case where the discharge current of the battery pack is detected and is equal to an overcurrent.

21. A system according to claim 12, wherein said discharge control means turns OFF said discharge switching means and electrically disconnects the power supply to said main body circuit section in a case where the discharging voltage of said battery pack is detected and is equal to or less than a specified voltage.

22. A power source system of an information processing system, comprising:

a portable system main body having power source circuit means;

a single auxiliary battery unit which is connected and fixed to a casing of said system main body and is electrically connected in series to a power source input terminal of said power source circuit means; and battery circuit means mounted within the auxiliary battery unit for sequentially charging said auxiliary battery unit in accordance with an order of the power source circuit means of the system main body and the auxiliary battery unit and for sequentially discharging said auxiliary battery unit in accordance with the order of the auxiliary battery unit and the power source circuit means of the system main body.

23. A system according to claim 22, wherein said battery circuit means of said auxiliary battery unit comprises:

a battery pack in which a plurality of battery cells electrically connected in series are enclosed;

an input terminal electrically connected to said battery pack and electrically connected to an output terminal of AC adapter means for converting AC power into DC power;

an output terminal electrically connected to said power source input terminal of said power source circuit means;

voltage detecting means for detecting an input power source voltage from said input terminal;

current detecting means for detecting an output current to said output terminal;

discharge switching means for turning ON/OFF the electrical connection from said battery pack to said output terminal;

charge switching means for turning ON/OFF the electrical connection from said input terminal to said battery pack;

charge control means for detecting the electrical connection of said AC adapter means from the detection voltage of said voltage detecting means and for turning ON said charge switching means; and discharge control means for turning ON said discharge switching means and supplying external power to said system main body at the front stage in the case where the electrical connection of said AC adapter means is detected from the detection voltage of said voltage detecting means and for turning ON the discharge switching means and supplying a power source from said self battery pack to said system main body at the front state in the case where the non-electrical connection of the AC adapter means is detected from the detection voltage of said voltage detecting means.

24. A system according to claim 22, wherein said charge switching means comprises:

high speed charging means for supplying a current near a maximum allowable charge current of said battery pack, thereby charging at a high speed; and trickle charging means electrically connected in parallel to said high speed charging means for supplying an arbitrary current which is determined by a voltage difference between said input power source voltage and the charging voltage of the battery pack and a specified resistance value and wherein said charge control means makes said high speed charging means operative when the detection current of said current detecting means is equal to or less than a predetermined value in a state in which the electrical connection of said AC adapter means is detected, thereby charging at a high speed, and also makes said trickle charging means operative when said detection current exceeds said predetermined value, thereby trickle charging.

25. A system according to claim 23, wherein said charge control means turns OFF said charge switching means and stops the charging when an elapsed time of a timer activated at the start of the charging reaches a predetermined time.

26. A system according to claim 23, wherein said charge control means turns OFF said charge switching means and stops the charging when a detection temperature by temperature detecting means provided for said battery pack exceeds a predetermined temperature.

27. A system according to claim 23, wherein said charge control means monitors the power source voltage of said battery pack and when a change such that the voltage which rises in association with the charging exceeds a peak voltage and decreases is detected, said charge control means turns off said charge switching means and stops the charging.

28. A system according to claim 22, further comprising display means for indicating a state of said auxiliary battery unit.

29. A system according to claim 28, wherein said display means displays at least an inputting state of an external power source to said input terminal, a charging state, and a state of the battery voltage.

30. A system according to claim 28, wherein said display means has display switching means for displaying information only during an ON operation.

31. A system according to claim 23, wherein said discharge control means turns OFF said discharge switching means and electrically disconnects said battery pack in a case where the discharge current of the battery pack is detected and is equal to an overcurrent.

32. A system according to claim 23, wherein said discharge control means turns OFF said discharge switching means and electrically disconnects the power supply to said system main body at the front stage in the case where the discharge voltage of the battery pack is detected and is equal to a specified voltage.

33. A system according to claim 22, wherein said power source circuit means of said system main body comprises:
a battery pack in which a plurality of battery cells electrically connected in series are enclosed;
a power source input terminal to which an output terminal of said auxiliary battery unit or an output terminal of AC adapter means for converting AC power into DC power;
an output terminal to supply a power source to a main body circuit section;
voltage detecting means for detecting an input voltage from said input terminal;
current detecting means for detecting an output current to said output terminal;
discharge switching means for turning ON/OFF the electrical connection from said battery pack;
charge switching means for turning ON/OFF the electrical connection from said power source input terminal to the battery pack;
charge control means for detecting the electrical connection of said AC adapter means from the detection voltage of said voltage detecting means and for turning ON said charge switching means and charging said battery pack only when the detection current of said current detecting means is equal to or less than a predetermined value; and
discharge control means for turning OFF said discharge switching means and electrically disconnecting said battery pack in the case where the electrical connection of said AC adapter means or said auxiliary battery unit is detected from the detection voltage of said voltage detecting means, and for turning ON the discharge switching means and supplying the power source from the battery pack to said main body circuit section in the case where the non-electrical connection of the AC adapter means or said auxiliary battery unit is detected from the detection voltage of said voltage detecting means.

34. A system according to claim 33, wherein said charge switching means comprises:
high speed charging means for supplying a current near a maximum allowable charge current of said battery pack, thereby charging at a high speed; and
trickle charging means electrically connected in parallel to said high speed charging means for charging said battery pack by an arbitrary current which is determined by a voltage difference between the input power source voltage and the charging voltage of said battery pack and a specified resistance value, and
wherein said charge control means makes said high speed charging means operative when the detection current of said current detecting means is equal to or less than a predetermined value in a state in which the electrical connection of said AC adapter means is detected, thereby charging at a high speed, and also makes said trickle charging means operative when said detection current exceeds said predetermined value, thereby trickle charging.

35. A system according to claim 33, wherein said charge control means turns off said charge switching means and stops the discharging when the elapsed time of a timer activated at the start of the charging reaches a predetermined time.

36. A system according to claim 33, wherein said charge control means turns OFF said discharge switching means and stops the discharging when a detection temperature by temperature detecting means provided for said battery pack exceeds a predetermined temperature.

37. A system according to claim 33, wherein said charge control means monitors the power source voltage of said battery pack and when a change such that the voltage which rises in association with the charging exceeds a peak voltage and decreases is detected, said charge control means turns off said discharge switching means and stops the discharging.

38. A system according to claim 33, further comprising display means for indicating a state of said power source circuit means.

39. A system according to claim 38, wherein said display means displays at least an inputting state of an external power source to said input terminal, a charging state, and a state of the battery voltage.

40. A system according to claim 38, wherein said display means has display switching means for displaying information only during an ON operation.

41. A system according to claim 33, wherein said discharge control means turns OFF said discharge switching means and electrically disconnects said battery pack in a case where the discharge current of the battery pack is detected and is equal to an overcurrent.

42. A system according to claim 33, wherein said discharge control means turns OFF said discharge switching means and electrically disconnects the power supply to said main body circuit section in a case where the discharging voltage of said battery pack is detected and is equal to or less than a specified voltage.

* * * * *